(No Model.)

W. F. ODEN.
ORE ROASTING DISH.

No. 454,759. Patented June 23, 1891.

WITNESSES:
Donn Twitchell
C. Sedgwick

INVENTOR:
W. F. Oden
BY Munn & Co.
ATTORNEYS

UNITED STATES PATENT OFFICE.

WILLIAM F. ODEN, OF BUTTE CITY, MONTANA.

ORE-ROASTING DISH.

SPECIFICATION forming part of Letters Patent No. 454,759, dated June 23, 1891.

Application filed December 3, 1890. Serial No. 373,461. (No model.)

*To all whom it may concern:*

Be it known that I, WILLIAM F. ODEN, of Butte City, in the county of Silver Bow and State of Montana, have invented new and useful Improvements in Ore-Roasting Dishes, of which the following is a full, clear, and exact description.

The invention relates to ore-roasting dishes such as used in an assayer's muffle or otherwise for roasting small quantities of ore preliminary to or during the process of assaying.

The object of the invention is to provide a new and improved ore-roasting dish, which is simple in construction and prevents loss of the ore during the operation, at the same time giving free access of air to the contents of the dish.

The invention consists of a bowl provided with an annular inner rim, bridges connecting the said inner rim with the outer rim of the bowl, and a cover formed like an inverted bowl and adapted to rest on the said bridges.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in both figures.

Figure 1:
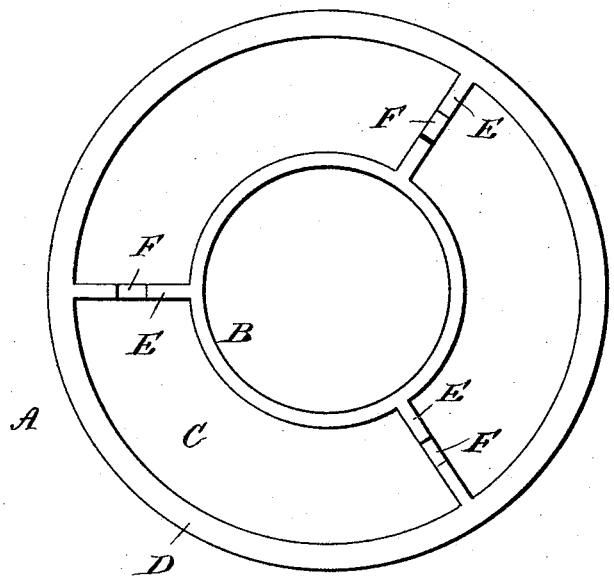
Figure 2:
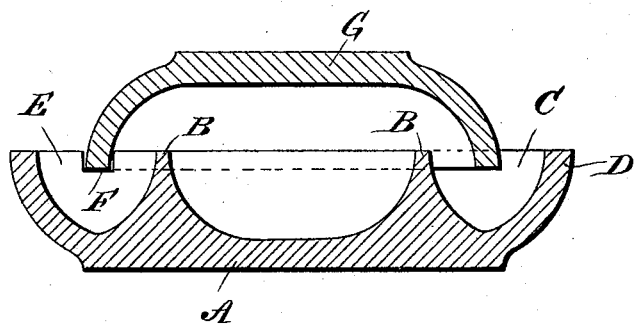

Figure 1 is a plan view of the bowl, and Fig. 2 is a sectional side elevation of the improvement.

The improved ore-roasting dish is provided with a bowl A, in which is formed an annular rim B, forming a space C between it and the outer rim D of the bowl. The rim B is of the same height as the rim D, and the two rims are connected with each other by a number of bridges or partitions E, each having in its top a notch F, the several notches being preferably arranged in a circle and at or near the middle of the bridges. The notches F are adapted to be engaged by the lower edge of the rim of a cover G, preferably made like an inverted bowl, as is plainly illustrated in Fig. 2.

In using the ore-roasting dish the cover G is removed, the ore is placed in the space formed within the inner rim B, and then the cover G is placed on the bowl, resting with its lower edge within the notches F of the bridges E, so that the cover is held in place, and at the same time its lower edge extends below the tops of the inner rim B and the outer rim D.

When the dish is now used in the ordinary manner, wasting of the ore is prevented, as any flying or spitting particles of ore are arrested by the cover G, and if not deflected back to the ore pass into the space C and drop to the bottom of the same. Air from the outside has free access to the ore within the rim B, the air passing through the space C and under the cover G to the middle part of the bowl A.

It will thus be seen that the dish can be conveniently handled and heated without danger of wasting the ore.

Having thus described my invention, I claim as new and desire to secure by Letters Patent—

1. An ore-roasting dish comprising a bowl provided with an inner rim, bridges connecting the inner rim with the outer rim of the bowl, and a cap made in inverted-bowl shape resting with its lower edge on the said bridges, substantially as shown and described.

2. An ore-roasting dish comprising a bowl having an inner annular rim, a series of bridges connecting the said inner annular rim with the outer rim of the bowl, each of said bridges being provided with a notch on top at or near its middle, and a cap made like an inverted bowl and fitting at its lower edge into the said notches of the bridges, substantially as shown and described.

3. In an ore-roasting dish, a bowl provided with an inner rim forming two concentric spaces, and a series of bridges connecting the said inner rim with the outer rim of the bowl, substantially as shown and described.

WILLIAM F. ODEN.

Witnesses:
C. P. DRENNEN,
T. H. ELLIS.